Figure 1:
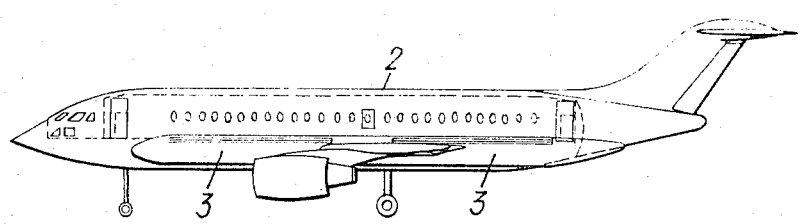

United States Patent [19]
Chinchester-Miles

[11] 3,785,596
[45] Jan. 15, 1974

[54] IMPROVEMENTS IN OR RELATING TO AIRCRAFT CONTROLS

[75] Inventor: Ian Chinchester-Miles, Harpenden, England

[73] Assignee: Hawker Siddeley Aviation Limited, Surrey, England

[22] Filed: May 26, 1972

[21] Appl. No.: 257,077

[30] Foreign Application Priority Data
May 27, 1971 Great Britain.................. 17652/71

[52] U.S. Cl. ............ 244/83 R, 35/12 T, 244/12 R, 244/77 R
[51] Int. Cl. .......................................... B64c 19/00
[58] Field of Search ............. 244/83 R, 83 E, 12 R, 244/75 R, 77 R, 84, 55; 74/471 X, 471 Y; 35/12 R, 12 P, 12 T, 12 W

[56] References Cited
UNITED STATES PATENTS

| | | | |
|---|---|---|---|
| 3,282,536 | 11/1966 | Iddon | 244/75 R |
| 3,341,154 | 9/1967 | Howes | 244/75 R |
| 3,388,878 | 6/1968 | Peterson et al. | 244/55 X |
| 3,485,463 | 12/1969 | Miller | 244/83 E |

Primary Examiner—Duane A. Reger
Assistant Examiner—Barry L. Kelmachter
Attorney—Rose & Edell

[57] ABSTRACT

A flying control system in a VTOL or V/STOL aircraft comprises a mechanical analoque 'model' of the lift and propulsion plant of the aircraft. Vertically-disposed electromechanical transducers represent, respectively, the lift engines of the aircraft, each transducer being vertically extendible and also tiltable in the fore-and-aft direction and delivering two electrical output signals, indicating vertical extension and tilt respectively, to control respectively the throttle opening and thrust deflection of the respective engine. The transducers are actuated by a mechanical assembly that receives pilots' command and autostabiliser inputs and is caused to "yaw", "roll" and "pitch" by movement of the rudder pedals and control column, and to translate vertically and horizontally fore-and-aft by movements of a lift control lever.

13 Claims, 6 Drawing Figures

IMPROVEMENTS IN OR RELATING TO AIRCRAFT CONTROLS

This invention relates to VTOL or V/STOL aircraft, more particularly those aircraft employing a multiplicity of direct lift engines.

In certain known proposals for this type of aircraft, the lift engines are arranged in longitudinal rows symmetrically about the centre line of the aircraft and disposed in sponson pods close to the fuselage sides. For the VTOL mode the lift engines give a vertically-directed lift thrust, while in the various transitional flight modes involving a component of horizontal motion, the thrust is turned into a forward or rearward direction to obtain deceleration or acceleration. This is achieved by tilting the engines about a transverse axis, or by gas deflection arrangements wherein the operation of deflectors or shutters controls the direction of the air or gas streams issuing from the lift engines. Furthermore, modulation of throttle settings independently of, or in conjunction with, engine tilt or thrust deflection, on selected groups of lift engines, can provide attitude control in yaw, roll and pitch during the V/STOL and transition mode when normal control surfaces are substantially ineffective.

The control task imposed on the pilot under these circumstances can be quite severe and, in addition, the transmission of pilot's command signals to the lift units by orthodox mechanical means such as push rods, levers, etc. can give unacceptable complexity and severe weight penalties. It is, therefore, an object of the present invention to alleviate these complexities.

According to the present invention, there is provided a flying control system in a VTOL or V/STOL aircraft wherein pilot's command signals for the control of attitude, horizontal and vertical movement are applied to a resolver device consisting of an analogue mechanical 'model' of the lifting power plant and thrust deflection arrangements of the aircraft.

Mechanical movement of the 'model' in response to one or more of the command input movements can initiate appropriate control signal outputs to engine throttle and thrust deflector actuators, e.g. from electro-mechanical transducers incorporated within the device. Each transducer may correspond to a respective lift engine and may transmit two control voltages to an appropriate electro-mechanical actuator assembly at each lift engine giving two mechanical outputs, one for nozzle swivel or deflection and the other for throttle setting.

A principal advantage of this device is the ability to sum within the 'model' both attitude and thrust direction commands, and it is of considerable benefit to the pilot that the attitude commands are transmitted by orthodox rudder pedals and control column so that for the control of roll, pitch and yaw the pilot's controls are common to both conventional flight and the V/STOL mode. The additional control for thrust direction command can be operated by the one pilot using his free hand, or in a dual control capacity one pilot can control attitude while the other controls thrust direction.

Figure 2:
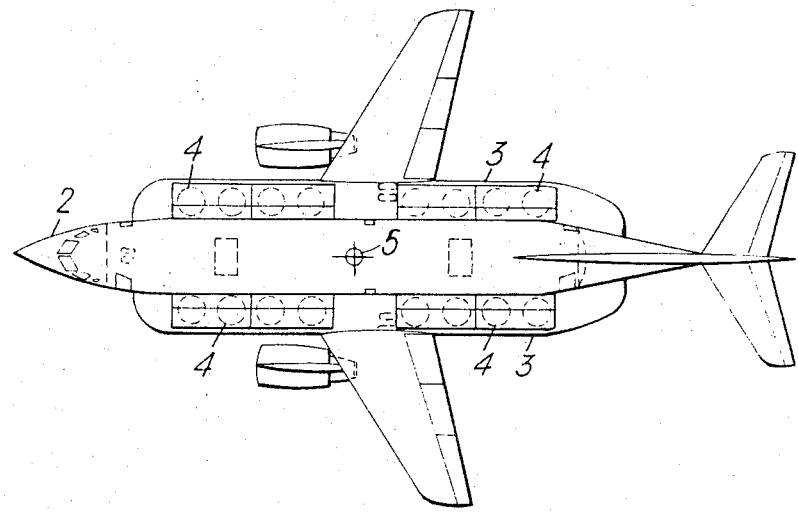
Figure 3:
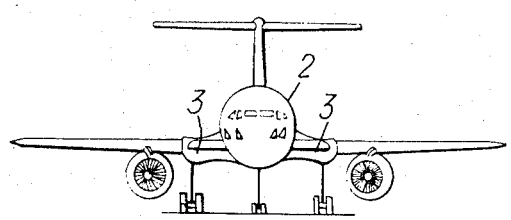
Figure 4:
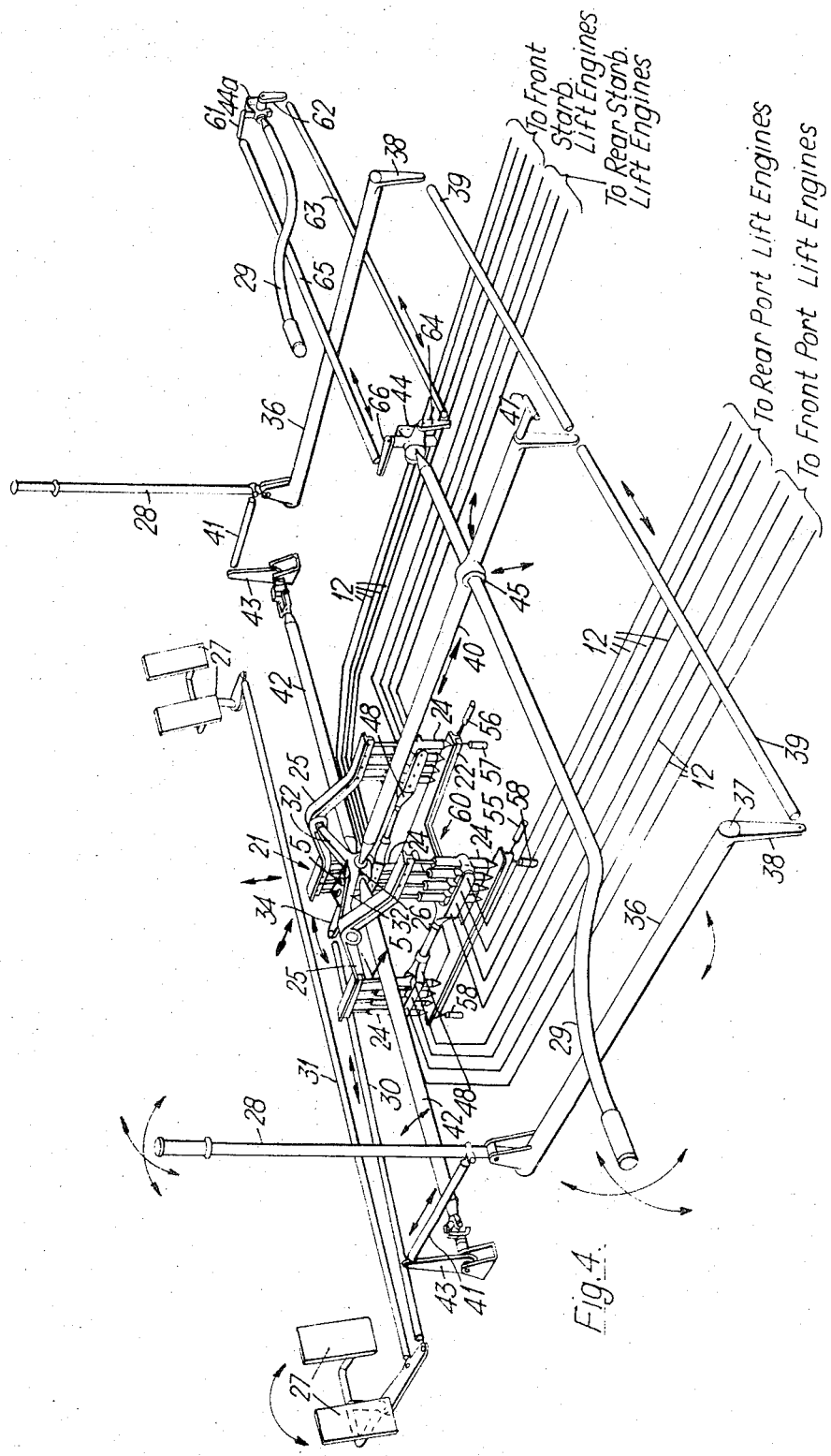
Figure 5:
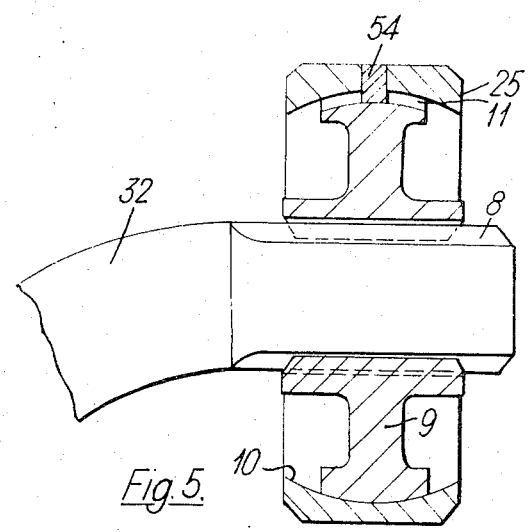
Figure 6:
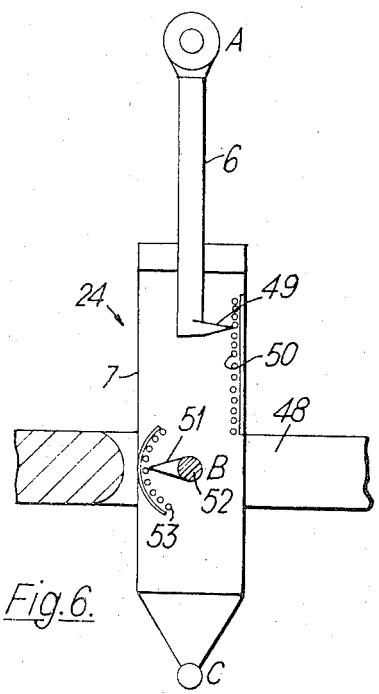

To better illustrate the invention there will now be described, by way of example, a control system embodying the invention, reference being had to the accompanying drawings, in which:

FIGS. 1 to 3 show, in side elevation, plan and front elevation, respectively, a V/STOL airliner with lift engines disposed in sponsons along opposite sides of the aircraft fuselage, FIG. 4 is a perspective diagram of the control system, FIG. 5 is a detail view in section on the line 5—5 of FIG. 4, and FIG. 6 shows one of the transducers of the control system in longitudinal section.

FIGS. 1 to 3 illustrate a V/STOL airliner having along each side of the fuselage 2, longitudinal lift engine sponson pods 3 containing a total of sixteen lift engine units 4 disposed in four groups of four engines as shown. In this arrangement the forward and rear banks of engines are substantially disposed equally fore and aft of the aircraft centre of gravity, indicated at 5.

Referring now to FIG. 4, this shows the general layout of the V/STOL dual control system. Located for preference on the aircraft longitudinal centre line is a mechanical model 21 comprising a central boss 26 from which extend two arms 32 in the direction of the aircraft transverse axis. These arms connect to two cranked arms 25 which lie essentially parallel to the aircraft longitudinal axis. Extending forward from the central boss is a yaw control arm 34 and, in addition, two pitch control shafts 42 extend laterally from the boss in opposite directions and a long longitudinal shaft 40 extends rearward. At the end regions of the two cranked arms 25 are pivotally attached the upper extremities of groups of electro-mechanical transducers 24, four in each group, representative of the groups of lift engines. The motion of these transducers is restricted to only fore-and-aft rocking by two members 48 forked at both ends, the stiffness of the forks ensuring that each transducer cannot rock in the transverse plane. The lower extremities of the transducers are pivotally connected to a stiff "floating" platform 22 of H configuration which is acted upon by autostabiliser output signals as described in more detail later.

A consideration of the device will indicate that its configuration is representative of the lift engine disposition on the aircraft, with the central boss 26 representing the aircraft centre of gravity and the ends of the cranked arms 25 corresponding to the four banks of lift engines, each transducer 24 representing an individual lift engine. Further consideration of the compound movements of this device, to be later described, will show that they are of the same type as changes in aircraft attitude in roll, pitch and yaw, or a combination of these, about the appropriate aircraft axes. Each transducer 24 (FIG. 6) comprises a plunger rod 6 working telescopically in a casing 7 and is designed such that variations in its length bring about corresponding changes in an output control voltage as the result of a contact 49 on the rod moving along a winding 50 fixed inside the casing. Similarly, fore-and-aft tilting motion of the transducer is converted to voltage fluctuations in a separate control wiring as a result of a contact 51 attached to fork pivot 52 moving over an arcuate winding 53 which is also mounted in the casing of the transducer. Changes in transducer length can occur either by movement of point A up or down initiated from the pilot's controls or by movement of point C up or down initiated by inputs from the autostabiliser. Similarly tilt can be initiated from point A or C.

To ensure that sideways deflection of the transducer does not result from movement of the cranked arms 25 each joint connection between these and the arms 32 connected to the central boss 26 is provided with additional freedoms. This joint is shown in FIG. 5. The extremities of the transverse arms 32 are in splined connection at 8 with central hubs 9 of the cranked arms 25 to enable the effective length of each transverse arm 32 to vary. In addition, each hub 9 is mounted in a spherical bearing 10 in the arm 25 to enable the central boss assembly 26, 32 to roll and yaw without twisting the cranked arms 25; to ensure that a pitching motion can be transmitted through the joint a peg 54 is fitted through the spherical bearing 10 and engages in a groove or slideway 11 of the hub 9 lying substantially in the transverse vertical plane containing the arms 32.

Electrical cables 12 interconnect each transducer 24 with an electro-mechanical actuator device at the respective lift engine 4. Although for clarity only one electrical cable run is indicated for each engine, in fact a pair of cables are used, transmitting outputs of throttle levels and thrust direction.

To ensure freedom from multiple control failure it is intended that each transducer 24 be fed with electrical power from a generator driven by its own engine. This isolates each engine control loop from all others and ensures that a failure of one unit does not influence any of the remaining engines.

The pilot's control means comprise rudder pedals 27 for yaw control, control columns 28 for pitch and roll control, and thrust direction levers 29 for vertical and horizontal directional control. In conventional flight the rudder pedals and control columns actuate the rudder, ailerons and elevators, but the interconnecting systems for these purposes are omitted to more clearly show the V/STOL controls.

Considering yaw control, rudder pedals 27 turn about vertical axes and are interconnected by a push rod 31. Actuation of either set of pedals imparts a horizontal endwise movement to a transverse push rod 30 pivotally connected to the lever 34 and so produces a yawing motion of the central boss 26. This motion produces a fore and aft movement of the ends of the arms 32 and consequently of the cranked arms 25. The result is that the transducers 24 on one side of the fore and aft centre line become tilted forward and those on the other side are tilted back, and signals are transmitted to the respective actuators at the lift engines 4 to bring about differential forward and rearward tilting of the engines or thrust deflectors, port and starboard, to effect the desired yawing movement of the aircraft.

Similarly, either control column 28 is capable of applying a pitch or roll moment to the 'model' or a combination of the two. For roll control, sideways angular movement of the control column applies rotation to a torque tube 36 about its longitudinal axis 37, and an arm 38 on the opposite end of this tube applies, via a transverse push rod 39, a corresponding rotation to the shaft 40 situated on the fore and aft centre line of the 'model' 21. The torque rod 40, being torsionally connected to the central boss assembly 26, imparts to it a rolling moment. This extends the lengths of the transducers 24 on one side of the centre line and shortens those on the other side, thereby setting up a differential in engine thrust output between the port and starboard sides to give a corresponding rolling moment to the aircraft in the required direction.

For pitch control, control column 28 is either pushed forward or drawn backwards and a strut 41 applies a rotation to the respective pitch control shaft 42 via an arm 43. Once again this shaft 42, being torsionally connected to the central boss assembly 26, applies a pitching moment to the 'model' about the pitch axis, thereby lengthening the transducers 24 in front of the model 'centre of gravity' and shortening those behind, or vice versa, to set up differentials in thrust levels between the forward and rear banks of lift engines to give a corresponding pitching moment to the aircraft in the required direction.

Horizontal and vertical thrust control is obtained by movements of either thrust control rod 29 which, in the case of the port control rod, passes through the roll control shaft 40, being supported within that shaft by a spherical bearing 45 and located on the aircraft structure at its starboard end beyond the bearing 45 by a universal pivot at 44. Raising or lowering of the control rod 29 pivots the shaft 40 about a transverse horizontal pivot 47 on the aircraft structure at its rear end and in so doing raises or lowers the central boss assembly 26 giving a substantially uniform extension or shortening of the transducer lengths for the vertical lift mode. Similarly, forward or rearward movement of the control 29 about its universal pivot imparts corresponding forward or rearward endwise translational movement to the shaft 40 and central boss assembly 26 resulting in tilting of all the transducers 24 in unison to produce appropriate settings of engine tilt or thrust deflection. The second pilot's control lever 29 is similarly pivotally located on the aircraft structure by a universal pivot 44a; the up and down motion of this starboard lever 29 is transmitted to an arm 62 and thence via a transverse push rod 63 to a similar arm 64. This arm 64 is connected to the first pilot's control lever 29 at the pivot 44 ensures that the two control levers move up and down by equal amounts so that both equally control the motion of the bearing joint 45. Similarly, the fore and aft motion of the second pilot's control lever 29 is transmitted via a lever 61 and a push rod 65 to a lever 66 and so to the first pilot's control lever 29, thereby effecting fore-and-aft motion of the bearing joint 45.

Although the controls of attitude have been described independently it should be understood that a number of operations can be combined if required and the 'model' will automatically sum these commands for correct engine settings. Furthermore, it will be understood that a pure yawing control movement or a horizontal thrust control movement, for instance, not only tilts the transducers to produce appropriate thrust deflection but, at the same time, causes a change in length of the transducers, due to the fact that, assuming the vertical distance between the cranked arms 25 and platform 22 remains unchanged, the length of the slant path between them that a tilted transducer occupies is greater than the direct vertical path and depends on the angle of tilt. This has the beneficial effect that the throttle settings also change to compensate for the change in the vertical lifting thrust component that arises when the thrust deflection angle is changed. As previously described, the transducers are restrained from individual sideways tilting by the forked members 48; in fact, precautions are taken to avoid sideways forces being applied to any group of transducers. This is partly because the lift engines they control have no ability to vector their thrust in other than the fore-and-aft plane. It is not sufficient to ignore any sideways tilt that might be introduced inadvertently, because, although the tilt as such would not be sensed by the electrical signalling system, there would be a resulting change in vector length or "slant path" of the transducer, which would lead to an inaccurate measure of transducer length and so to an inaccurate level of engine throttle setting.

The invention has been described around manual control, with the pilot's commands being accepted by the upper 'spider' assembly 26, 32, 25. The unit can equally well be connected to an autostabiliser. Platform 22 is acted upon by inputs from the autostabiliser into two electric actuators 55 and 56, which are attached horizontally to the aft ends of the H platform, and four actuators 57, 58 which are attached vertically to the four corners of the platform. Roll, pitch and lift motions of the platform are produced by differential or collective operation of the vertical actuators 57, 58 and yaw and horizontal thrust change movements are produced by differential or collective operation of the horizontal actuators 55, 56. As the autostabiliser-actuated platform 22 operates on the lower ends of the transducers 24, the applied movements to the platform must be in the opposite sense or "mirror image" of the true motions, i.e. for "up" motion of the aircraft the platform motion is "down", for "left" motion is "right, and so on.

Considerable departures from the arrangements described are possible within the scope of the invention. The layout of the resolving device or 'model' can be varied to suit alternative engine layouts, either in sponsons as described, or incorporated elswhere within the aircraft structure, or in lift pods mounted on the wing structure.

I claim:

1. A control system in a V/STOL aircraft having as its lifting power plant a plurality of vectored thrust lift engines, said system including a resolver device consisting of an analogue mechanical "model" of the lifting power plant and thrust deflection arrangements of the aircraft, to which device pilot's command signals for the control of attitude, horizontal and vertical movement are applied, and characterized in that the model comprises a plurality of transducers, each transducer representing a different respective vectored thrust lift engine of the aircraft and delivering separate control signals for engine thrust deflection and engine throttle opening to its respective engine in response to pilots' command inputs to the model.

2. A system according to claim 1, wherein each transducer is both tiltable (in a fore-and-aft direction only) and adjustable in a lengthwise generally vertical direction, and delivers a first control signal for engine thrust deflection according to its angle of tilt and a second separate control signal for engine throttle opening according to its lengthwise adjustment.

3. A system according to claim 1 wherein the transducers are electro-mechanical, each transducer delivering electrical control signals to its respective engine in response to pilots' commands applied mechanically.

4. A system according to claim 1 wherein the transducers are responsive to autostabiliser input signals in addition to pilots' command inputs.

5. A system according to claim 1, wherein each transducer is powered by its respective engine in a manner such that failure of one does not affect the control of any of the other engines.

6. A system according to claim 1, wherein the transducers are located in the model at positions analogous to the positions in the aircraft of the respective lift engines they represent.

7. A system according to claim 1, wherein the transducers are actuated by a mechanical assembly having a hub representative of the aircraft centre of gravity and which can be raised and lowered, translated fore-and-aft, and tilted and turned in all directions about axes passing through said hub, by mechanically-applied pilots' command inputs.

8. A system according to claim 7, wherein the pilots' controls comprise rudder pedals, which are connected to cause yawing movements of said mechanical assembly, control columns, which are connected to cause rolling and pitching movements of said mechanical assembly, and engine thrust control rods, which are connected to cause vertical and fore-and-aft translational movements of said mechanical assembly.

9. A system according to claim 7, wherein the movements of the mechanical assembly are transmitted to the transducers via couplings which isolate the transducers from any tilting movements of the assembly other than fore-and-aft tilting movements.

10. A system according to claim 9, wherein the transducers are generally vertically disposed, said mechanical assembly is coupled to their upper ends, and autostabiliser inputs are applied by mechanical actuators coupled to their lower ends, the autostabiliser input motions being inversions or mirror images of the true motions which they represent.

11. A system according to claim 10, wherein the transducers represent groups of lift engines disposed fore and aft, and port and starboard, of the aircraft centre of gravity, and are correspondingly disposed forward and aft, left and right, of the hub or boss of the mechanical assembly of the model, and said mechanical assembly comprises a pair of arms extending transversely from the hub and coupled at their extremities to the mid-regions of further arms extending fore-and-aft and connected to the upper ends of the transducers.

12. A system according to claim 11 wherein said tilt-isolating couplings serve to couple the transverse arms to the fore-and-aft arms.

13. A system according to claim 11, wherein the lower ends of the transducers are all connected to a generally horizontal rigid but "floating" platform, and the autostabiliser actuators include horizontally-and-vertically-disposed actuators coupled to said platform.

* * * * *